United States Patent
Gentry et al.

(10) Patent No.: US 11,455,188 B2
(45) Date of Patent: Sep. 27, 2022

(54) SYSTEM AND METHOD FOR INCREASING ROBUSTNESS OF HETEROGENEOUS COMPUTING SYSTEMS

(71) Applicant: University of Louisiana at Lafayette, Lafayette, LA (US)

(72) Inventors: James Gentry, Lafayette, LA (US); Mohsen Amini Salehi, Lafayette, LA (US); Chavit Denninnart, Lafayette, LA (US)

(73) Assignee: UNIVERSITY OF LOUISIANA AT LAFAYETTE, Lafayette, LA (US)

( * ) Notice: Subject to any disclaimer, the term of this patent is extended or adjusted under 35 U.S.C. 154(b) by 112 days.

(21) Appl. No.: 16/860,286

(22) Filed: Apr. 28, 2020

(65) Prior Publication Data

US 2020/0356408 A1   Nov. 12, 2020

Related U.S. Application Data

(60) Provisional application No. 62/844,156, filed on May 7, 2019.

(51) Int. Cl.
| | |
|---|---|
| *G06F 9/48* | (2006.01) |
| *G06F 9/54* | (2006.01) |
| *G06F 9/50* | (2006.01) |

(52) U.S. Cl.
CPC .......... *G06F 9/4881* (2013.01); *G06F 9/5011* (2013.01); *G06F 9/546* (2013.01)

(58) Field of Classification Search
CPC ....... G06F 9/4881; G06F 9/5011; G06F 9/546
See application file for complete search history.

(56) References Cited

U.S. PATENT DOCUMENTS

| | | | | |
|---|---|---|---|---|
| 6,578,005 | B1* | 6/2003 | Lesaint | G06Q 10/06 705/7.14 |
| 10,152,357 | B1* | 12/2018 | Espy | G06F 9/5005 |
| 2009/0198389 | A1* | 8/2009 | Kirchhof-Falter | G06F 9/4887 701/1 |
| 2010/0293353 | A1* | 11/2010 | Sonnier | H04L 49/101 711/170 |
| 2015/0040136 | A1* | 2/2015 | Matthes | G06F 9/5094 718/104 |
| 2021/0282034 | A1* | 9/2021 | Hwang | H04L 1/0027 |

* cited by examiner

*Primary Examiner* — Emerson C Puente
*Assistant Examiner* — Jonathan R Labud
(74) *Attorney, Agent, or Firm* — Kean Miller LLP; Russel O. Primeaux; Jessica C. Engler

(57) ABSTRACT

Disclosed is a method for task pruning that can be utilized in existing resource allocation systems to improve the systems' robustness without requiring changing to existing mapping heuristics. The pruning mechanism leverages a probability model, which calculates the probability of a task competing before its deadline in the presence of task dropping, and only schedules tasks that are likely to succeed. Pruning tasks whose chance of success is low improves the chance of success for other tasks. Tasks that are unlikely to succeed are either deferred from current scheduling event or are preemptively dropped from the system. The pruning method can benefit service providers by allowing them to utilize their resources more efficiently and use them only for tasks that can meet their deadlines. The pruning method further helps end users by making the system more robust in allowing more tasks to complete on time.

17 Claims, 13 Drawing Sheets

FIGURE 10
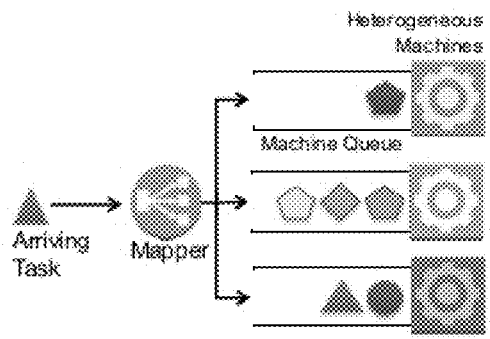
(a) Immediate-mode resource allocation.
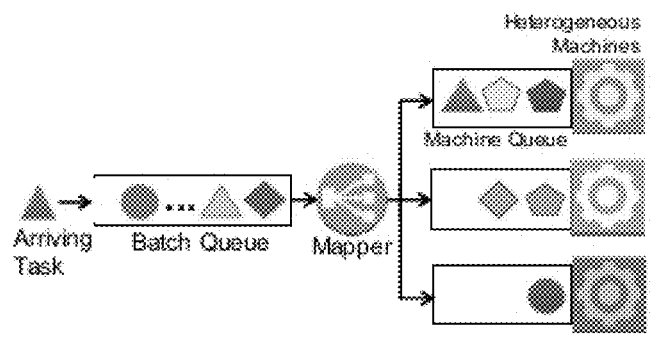
(b) Batch-mode resource allocation.
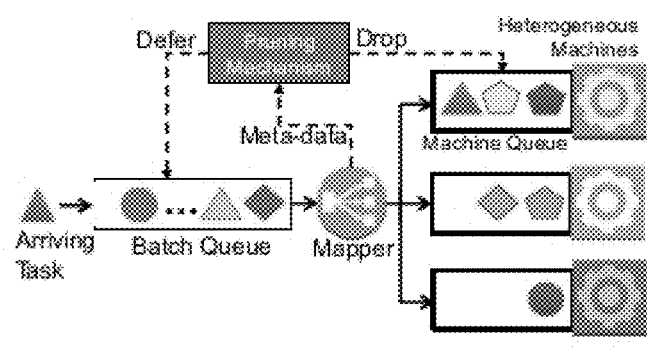
(c) Batch-mode resource allocation, with task pruning mechanism attached.

FIGURE 13

α ← Dropping Toggle
β ← Pruning Threshold
c ← Fairness Factor
$\gamma_{1...n}$ ← Fairness Score of all task types Upon triggering of a mapping event:
(1) Drop all pending tasks that missed their deadlines
(2) Collect and process data of all task $t_f$ completed on-time since previous mapping event
   — $k$ ← task type of $t_f$
   — $\gamma_k \leftarrow \gamma_k - c$
(3) If oversubscription level is greater than α
   (4) For each task $t_i$ of type $k$ on machine queue $m_j$:
      (5) Calculate $chance(i,j)$
      (6) If $chance(i,j) \leq \beta - \gamma_k$
         — Drop $t_i$
         — $\gamma_k \leftarrow \gamma_k + c$
(7) While there is unmapped task and machine queues are not full:
   (8) Call mapping heuristic
   (9) For each task $t_i$ of type $k$ mapped to machine $j$:
      (10) If $chance(i,j) \leq \beta - \gamma_k$
         — Defer $t_i$ to the next mapping event
   (11) Dispatch remaining assigned tasks to machines

FIGURE 15
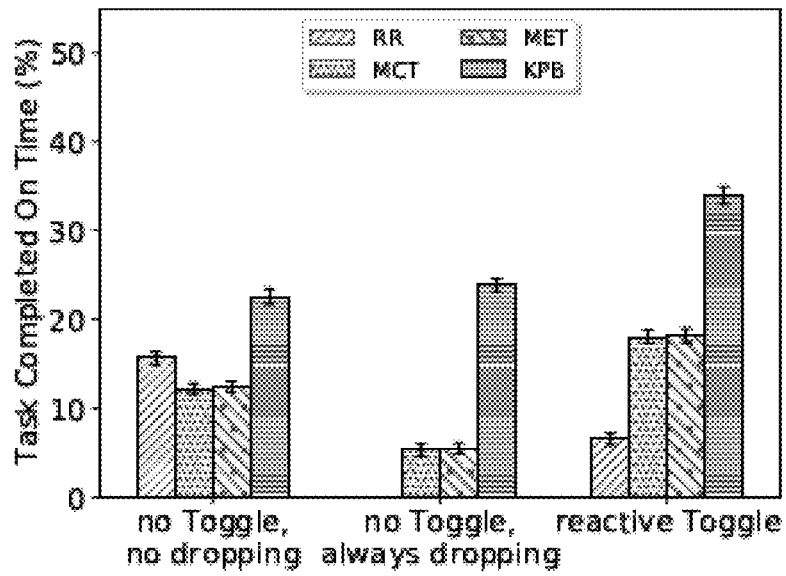
(a) Immediate-mode mapping heuristics
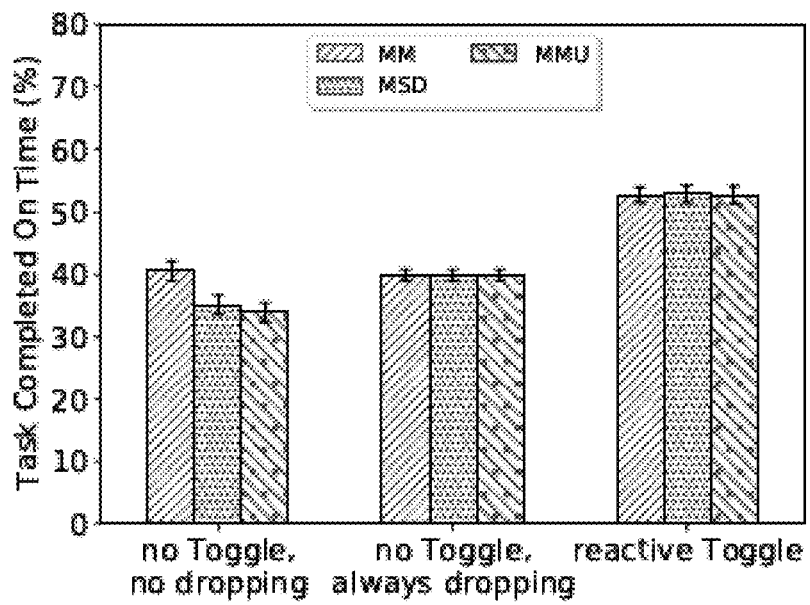
(b) Batch-mode mapping heuristics FIGURE 17
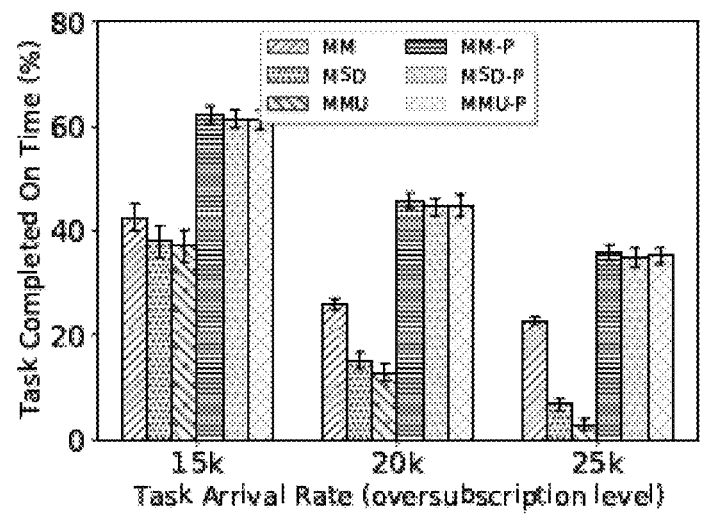
(a) Constant Arrival Pattern
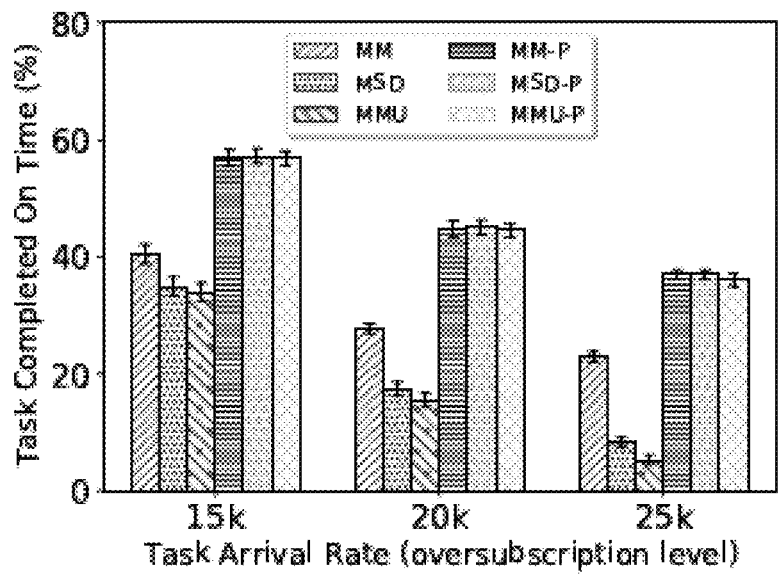
(b) Spiky Arrival Pattern FIGURE 18
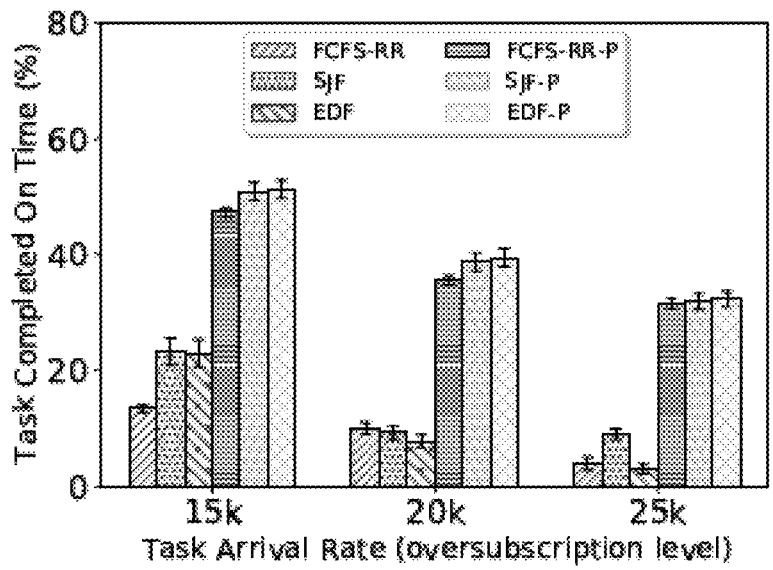
(a) Constant Arrival Pattern
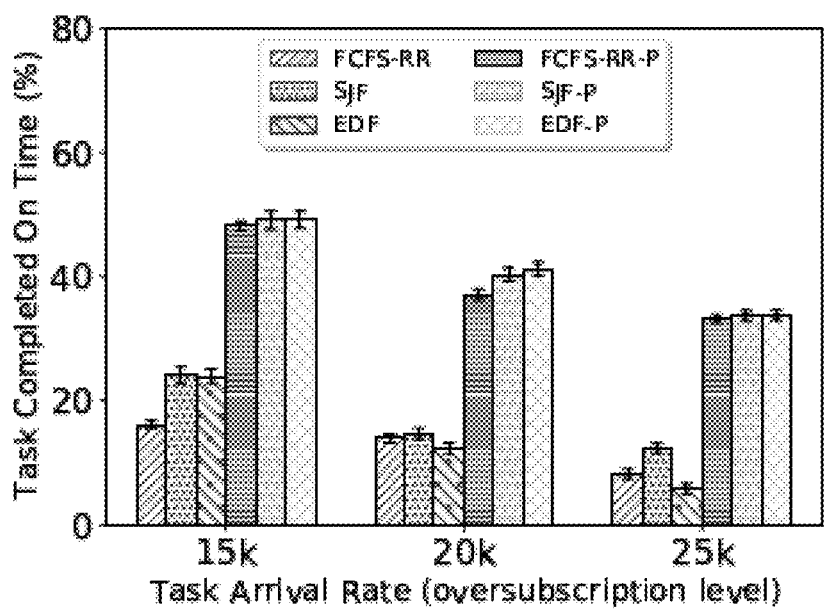
(b) Spiky Arrival Pattern

SYSTEM AND METHOD FOR INCREASING ROBUSTNESS OF HETEROGENEOUS COMPUTING SYSTEMS

CROSS REFERENCE TO A RELATED APPLICATION

This application claims priority to U.S. Provisional Application No. 62/844,156 titled "SYSTEM AND METHOD FOR INCREASING ROBUSTNESS OF HETEROGENEOUS COMPUTING SYSTEMS", filed on May 7, 2019.

STATEMENT REGARDING FEDERALLY SPONSORED RESEARCH OR DEVELOPMENT

Not applicable.

REFERENCE TO A "SEQUENCE LISTING", A TABLE OR A COMPUTER PROGRAM

Not applicable.

DESCRIPTION OF THE DRAWINGS

The drawings constitute a part of this specification and include exemplary examples of the SYSTEM AND METHOD FOR INCREASING ROBUSTNESS OF HETEROGENEOUS COMPUTING SYSTEMS, which may take the form of multiple embodiments. It is to be understood that, in some instances, various aspects of the invention may be shown exaggerated or enlarged to facilitate an understanding of the invention. Therefore, drawings may not be to scale. For the purposes of clarity, not every component may be labeled in every drawing.

FIG. 10 provides a rendering of batch-mode resource allocation operations on batches of tasks upon task completion (and task arrival when machines queues are not full). Immediate mode resource allocation operates immediately, upon arrival of a task to the system. Pruning mechanisms can be plugged into existing resource allocation system.

FIG. 13 provides a listing of the pruning mechanism procedure at each mapping event.

FIG. 15 provides graphs showing the impact of employing the Toggle module in a pruning mechanism works with immediate and batch mode heuristics. The horizontal axis shows how task dropping is engaged in reaction to oversubscription, and the vertical axis shows the percentage of tasks completed on time.

FIG. 17 shows that impact of pruning mechanism on batch-mode heuristics in HC systems. Horizontal axes show the number of tasks arriving within a time unit (i.e., oversubscription level). In the legend, "–P" denotes heuristic use pruning mechanisms.

FIG. 18 shows the impact of pruning mechanisms on mapping heuristics of homogeneous systems. The horizontal axes show the number of tasks arriving within a time unit (i.e., the oversubscription level). In the legend, "–P" denotes heuristics use pruning mechanism.

FIELD OF THE INVENTION

Figure 1:
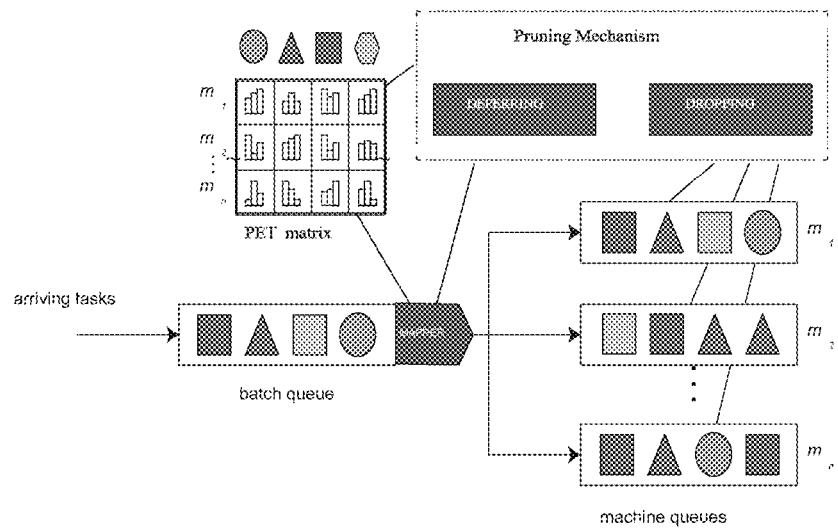
FIG. 1 provides a diagram of the pruning mechanism. Heterogeneous tasks are mapped to heterogeneous machines in batches. In each mapping, the pruner drops or defers tasks based upon their probability of success.

This invention is generally in the field of efficient, deadline and quality of service aware, robust computing; specifically, the field of computer resource allocation systems preemptive task deletion for tasks unlikely to complete prior to deadlines.

BACKGROUND OF THE INVENTION

Cloud-based serverless computing paradigm abstracts away the details of resource provisioning and deployment. A user only needs to define the require services (i.e., functions or tasks) and their Quality of Service ("QoS") expectations within the serverless platform. The user is then only charged for the actual resource usage and not for the idle times or under-utilized provisioned resources. Because of its ease-of-use and cost-efficiency, serverless platforms have become increasingly popular, particularity for micro-service deployments.

As a general computing system (on the back-end), the serverless platform receives service requests from multiple users. Each service request implies executing one or more tasks that potentially have diverse computing and memory demands. This diversity justifies the use of Heterogeneous Computing ("HC") systems to improve both QoS satisfaction and incurred cost. HC systems are systems that are more than one kind of processor. Heterogeneity of an HC system can be divided into qualitative and quantitative differences. Differences in architecture can be described as qualitative (e.g., GPU-based versus CPU-based architecture) whereas differences in performance within a given architecture can be described as quantitative (e.g., one computer has a faster CPU speed than the other). A system with both qualitative and quantitative differences between machines is described as "inconsistently heterogeneous" while a system with only quantitative differences is described as "consistently heterogeneous."

Inconsistent machine heterogeneity refers to differences in machine architecture (e.g., CPU versus GPU versus FPGA). Consistent machine heterogeneity describes the differences among machines of different architecture (e.g., different clock speeds). For an example, the Amazon Cloud offers inconsistent heterogeneity in the form of various Virtual Machine ("VM") types, such as a CPU-Optimized, Memory-Optimized, Disk-Optimized, and Accelerated Computing (GPU and FPGA). Within each type, various VMs are offered with consistent performance scaling with price.

Both consistent and inconsistent heterogeneity can exist in arriving tasks. For example, an HC system dedicated to processing live video streams is responsible for many categorically different types of tasks: changing video stream resolution, changing the compression standard, changing video bit rate. Each of these task types can be consistently heterogeneous within itself (e.g., it takes longer to change resolution of 10 seconds of video, compared to 5). A qualitative heterogeneity refers to different types of tasks in the workload (e.g., compressing a video segment versus changing its spatial resolution), whereas qualitative heterogeneity can refer to characteristics such as variety in data size within a certain task type (e.g., compressing video segments with different lengths). Qualitative heterogeneity among tasks leads to differences in execution times on different machine types in an HC system, known as "task machine affinity." For instance, parallel tasks (such as image filtering) perform faster (or have a higher affinity with) GPU-based machines whereas data-intensive tasks with many branching paths have a higher affinity on CPU-based machines with large memory. Quantitative heterogeneity within a given task type causes variation in the execution time of tasks of that type for each machine type within the HC system. Many HC systems present both consistent and inconsistent heterogeneity in machines used and task type processed. These systems present cases in which each task type can execute differently on each machine type, where machine type A performs task type 1 faster than machine type B does, but is slower than other machine types for task type 2. Specifically, compute intensive tasks run faster on a GPU machine whereas tasks with memory and disk access bottlenecks run faster on a CPU-based machine.

In an inconsistently heterogeneous system, making optimal mapping of arriving tasks on HC systems is desirable, but not practically feasible due to the high level of uncertainty and a large decision space. All of this heterogeneity results in uncertainty for a given execution time, and consequently, inefficiency of resource allocation.

Widely-used heuristics in both heterogeneous and homogeneous computing systems are reviewed. First, in Round Robin (RR), incoming tasks are assigned in a round robin manner to an available machine, from Machine 0 to Machine n. Second, for Minimum Expected Execution Time (MET), the incoming task i is assigned to the machine that offers the minimum expected execution time (i.e., the average of the PET(i, j) for task i on machine j). Third, for Minimum Expected Completion Time (MCT), the incoming task is assigned to the machine that offers the minimum expected completion time. The completion time is obtained based on the accumulated expected execution time of tasks queued in a given machine. Fourth, K-Percent Best (KPB) is a combination of MCT and MET. It only considers MCT amongst the K percent of machines with the lowest expected execution times for an incoming task.

MinCompletion-MinCompletion (MM):

MM is a popular mapping heuristic widely-used in the art. The PET matrix is used to calculate expected completion times. In the first phase of this two-phase heuristic, the virtual queue is traversed, and for each task in that queue, the machine with the minimum expected completion time is found, and a pair is made. In the second phase, for each machine with a slot in its machine queue, the provisional mapping pairs are examined to find the machine-task pair with the minimum completion time, and the assignment is made to the virtual machine queues. The process repeats itself until all virtual machine queues are full, or until the unmapped queue is exhausted.

MinCompletion-Soonest Deadline (MSD):

MSD is a two-phase process, first selecting the machine which provides the minimum expected completion time (using the PET matrix) for each task under consideration. In second phase, from this list of possible machine-task pairs, the tasks for each machine with the soonest deadline are chosen, and in the event of a tie, the task with the minimum expected completion time breaks the tie. As with MM, the process is repeated until either the virtual machine queues are full, or the unmapped task queue is empty.

MinCompletion-MaxUrgency (MMU):

MMU is a twophase process. The first phase is identical to MM and MSD. The second phase select task based on their urgency. Urgency for task i on machine j is defined as the inverse of the difference between the task deadline ($\delta_i$) and the expected completion time of the task on machine j ($E[C(t_{ij})]$). The equation below formally shows the urgency definition.

$$U_{ij} = \frac{1}{\delta_i - E[C(t_{ij})]}$$

As with MM and MSD, this process is repeated until either the temporary batch queue is empty, or until the virtual machine queues are full.

Next described are mapping heuristics for homogeneous systems.

First Come First Served-Round Robin (FCFS-RR):

In FCFS-RR, a task is selected in first come first serve manner and is assigned to the first available machine in a round robin manner, from Machine 0 to Machine n.

Earliest Deadline First (EDF):

EDF is functionally similar to MSD heuristic for HC systems. The first phase finds the machine with the least expected completion time. Then, the second phase sorts the arrival queue in an ascending order based on tasks' deadlines. Next, the task in the head of the arrival queue is assigned to the machine with minimum expected completion time. This process is repeated until all task are mapped or the machine queues are full.

Shortest Job First (SJF):

SJF is functionally similar to MM heuristic for HC systems. The first phase finds the machine with the least expected completion time. Then, the second phase sorts the arrival queue in an ascending order based on tasks' expected execution time. Next, the task in the head of the arrival queue is assigned to the machine with minimum expected completion time. This process is repeated until all tasks are mapped or the machine queues are full.

Four Baseline Mapping Heuristics are described. First, MinCompletion-MinCompletion (MM): This heuristic is known in the art. In the first phase of the heuristic, the virtual queue is traversed, and for each task in that queue, the machine with the minimum expected completion time is found, and a pair is made. In the second phase, for each machine with a free slot, the provisional mapping pairs are examined to find the machine-task pair with the minimum completion time, and the assignment is made to the machine queues. The process repeats itself until all machine queues are full, or until the batch queue is exhausted.

Second, MinCompletion-Soonest Deadline (MSD):

Phase one is as in MM. Phase two selects the tasks for each machine with the soonest deadline. In the event of a tie, the task with the minimum expected completion time is selected. As with MM, after each machine with an available queue slot receives a task from the provisional mapping in phase two, the process is repeated until either the virtual machine queues are full, or the unmapped task queue is empty.

Third, MinCompletion-MaxUrgency (MMU): Urgency of task i on machine j is defined as $U_{ij}=1/(\delta_i-E(C_{ij}))$, where $E(C_{ij})$ is the expected completion time of task i on machine j. Phase one of MMU is the same as MM. Using the urgency equation, phase two selects the task-machine pair that has the greatest urgency, and adds that mapping to the virtual queue. The process is repeated until either the batch queue is empty, or until the virtual machine queues are full.

Fourth, Max Ontime Completions (MOC):

This uses the PET matrix to calculate robustness of task-machine mappings. The first mapping phase finds, for each task, the machine offering the highest robustness value. The culling phase clears the virtual queue of any tasks that fail to meet a pre-defined (30%) robustness threshold. The last phase finds the three virtual mappings with the highest robustness and permutes them to find the taskmachine pair that maximizes the overall robustness and maps it to that machine's virtual queue. The process repeats until either all tasks in the batch queue are mapped or dropped, or until the virtual machine queues are full.

Robustness of a system is defined as its ability to maintain a given level of performance in the face of uncertainty. Maximization of the robustness of an inconsistently HC system used for processing tasks of a serverless computing platform is desirable. The performance metric to measure robustness of the HC system is based on the number of tasks completing before their deadlines. To achieve robustness, two sources of uncertainty that exist in HC systems are harnessed: namely uncertainty in the tasks' execution times and uncertainty in the tasks' arrival rate.

SUMMARY OF THE INVENTION

DETAILED DESCRIPTION OF THE INVENTION

To attain the robustness goal, the resource allocation of an HC system should not map tasks that are unlikely to complete on time (i.e., before its individual deadline). In fact, such mappings just increase the incurred cost without improving the robustness of HC system. More importantly, executing unlikely-to-succeed tasks postpones the execution of other pending tasks that subsequently miss their deadlines. Therefore, the strategy is to avoid executing unlikely-to-succeed tasks. The existing resource allocation systems of an HC system in a serverless computing platform operate either in the immediate- or batch-modes. In the former, as shown in FIG. 10(a), the mapper makes mapping decision immediately upon task arrival. In the latter, as shown in FIG. 10(b), arriving tasks are batched in a queue awaiting mapping to a machine at a later mapping event. Although both of these approaches are being utilized, batch-mode mapping yields to a higher overall robustness.

Disclosed herein is a pruning mechanism that is plugged into the resource allocation system (as shown in FIG. 10(c)), improving the robustness of the heterogeneous or even homogenous computing systems. The mechanism receives the tasks' metadata from the mapper and prunes unlikely to succeed tasks. The pruning mechanism is comprised of at least one of two methods, namely deferring or dropping. Task deferring deals with postponing the assignment of unlikely-to-succeed tasks to a next mapping event with the hope that the tasks can be mapped to a machine that provides a higher chance of success. Alternatively, when the system is oversubscribed, the pruning mechanism transitions to a more aggressive mode and drops the tasks that are unlikely to succeed. In short, the pruned tasks are either deferred to later mapping event or dropped to alleviate the oversubscription of the HC system.

Assuming that there are a few pending tasks in a machine queue awaiting execution ahead of an arriving task, each one of the pending tasks has uncertainty in its execution time; collectively, they introduce compound uncertainty for the arriving task's execution time. It is necessary to calculate the impact of this compound uncertainty on the likelihood of success for an arriving task. Then, the pruning mechanism should determine if the arriving task is worth assigning to the machine. In an HC system, for an arriving task that has a low chance of meeting its deadline, deferring its assignment to the next mapping event can potentially increase its chance of success. This is because such deferment provides the opportunity for the arriving task to be assigned to a machine with a higher affinity that may become available in a later mapping event. Furthermore, when the system is oversubscribed, it is possible to take an even more aggressive approach and drop pending tasks with low chance of success to increase the likelihood that other pending tasks succeed. As such, before determining deferring and dropping details, it is important to model the impact of task dropping on the probability of success for the tasks behind the dropped task. Then, we determine the appropriate probability for dropping and deferring.

Making task mapping decisions only based on chance of success could impact fairness of the system. In this case, the pruner consistently favors tasks with short execution time, while pruning other longer tasks. To avoid this problem, the pruning mechanism is equipped with a method to achieve fairness across various types of tasks exist in an HC system. The advantage of the disclosed pruning mechanism is that it does not require making any change in the existing resource allocation and mapping heuristic of the systems. Instead, the pruning mechanism is plugged into the existing mapping heuristic that best suits the system and improves its robustness.

Extensive simulation results on various workloads demonstrate that the disclosed mechanism increases robustness remarkably (by up to 35 percentage point). More importantly, the impact of this pruning mechanism is more substantial in HC systems that are highly overloaded.

The disclosed method benefits computing platform with heterogeneous machines, such as those used in edge computing. Another motivation is a cloud-based serverless platform where the service provider has budget constraints. In these scenarios, the service provider aims to maximize the number of service requests meeting their deadline constraint within their limited resources. Users issue independent service requests (tasks) from a set of offered service types (task-types). For example, a task can be modeled as an independent video segment in the form of Group Of Pictures (GOPs) that is sequentially processed (e.g., transcoded) within a deadline constraint. Each task has an individual hard deadline, which is the presentation time of that video segment. As there is no value in executing a task that has missed its deadline, the task must be dropped from the system.

Further motivation comes from HC systems that are used for processing live video streaming services (e.g., YouTube Live and Twitch.tv). In these services, video content is initially captured in a certain format and then processed (aka transcoded) to support diverse viewers' display devices. As there is no value in executing live video streaming tasks that have missed their individual deadlines, they are dropped from the HC system. It has been shown that, in such a system deploying an inconsistently HC system helps processing inconsistently heterogeneous task types (e.g., tasks to change resolution and tasks to change compression standard) and ensuring an uninterrupted streaming experience. FIG. 1 shows an overview of the system. Tasks are queued upon arrival and are mapped to available heterogeneous machines ($m_1, m_2, \ldots, m_n$) in batches.

In the described scenarios, both inconsistent task heterogeneity, in form of different task-types (e.g., transcoding types), and inconsistent machine heterogeneity, in form of different machine types, can be present. In serverless computing, mapping tasks to machines is hidden from the user and is carried out using mapping methods of the resource allocation system.

Tasks dynamically arrive into the resource allocation system. Their arrival rate and pattern is unknown in advance. Oversubscription occurs when task arrival is so intense that it is impossible to complete all tasks within their deadlines.

Due to variations in tasks' data sizes, the execution time of each task type on each machine type is stochastic. For instance, the execution time to change the resolution depends on the size of the GOP to be processed. The stochastic execution time of each task type on each machine type is modeled as a Probability Mass Function (PMF). In an inconsistently HC system, a Probabilistic Execution Time (PET) matrix is used to represent execution time distribution of each task type on each machine type.

Heterogeneous tasks dynamically arrive into a batch queue of unmapped tasks with no prior knowledge of the timing or order. The intensity of tasks arriving to the HC system (i.e., oversubscription level) also varies. To limit the compound uncertainty and maintain accuracy of mapping decisions, machines use limited-size local queues to process their assigned tasks in a first-come first-serve ("FCFS") manner. A mapping event occurs upon arrival of a new task or when a task gets completed. Before the mapping event, tasks that have missed their deadlines are dropped from the system. Then, the mapping event attempts to map tasks from the batch queue. This happens until either the machine queues are full, or there are no more unmapped tasks. Once a task is mapped to a machine, its data is transferred to that machine and it cannot be remapped due to data transfer overhead. Each task is independent and executes in isolation on a machine, with no preemption and no multitasking. To map tasks to machines, the mapper creates a temporary (virtual) queue of machine-task mappings and calculates the completion time distribution of each unmapped task on heterogeneous machines.

Upon dropping a task in a given machine queue, the completion time PMF of those tasks behind the dropped tasks is improved. Intuitively, dropping a task, whose deadline has passed or has a low chance of success, hereinafter "low quality tasks", enables the tasks behind it to begin execution sooner, thus, increasing their probability of success and subsequently, overall robustness of the HC system. Each task in queue compounds the uncertainty in the completion time of the tasks behind it in the queue. Dropping a task excludes its PET from the convolution process, reducing the compound uncertainty as well.

The pruning mechanism calculates the impact of dropping a task on the robustness of tasks behind the dropped task. Herein, the completion time and probability of meeting the deadline of task located behind a dropped task is calculated.

Each entry (i, j) of PET matrix is a PMF represents the execution time of task i's task type on a machine type j. In fact, PET(i, j) is a set of impulses, denoted $E_{ij}$, where $e_{ij}(t)$ represents execution time probability of a single impulse at time t. Similarly, completion time PMF of task i on machine j, denoted PCT(i, j), is a set of impulses, denoted $C_{ij}$, where $c_{ij}(t)$ is an impulse represents the completion time of task i on machine j at time t.

Let i a task with deadline $\delta_i$ arrives at time a and is given a start time on idle machine j. In this case, the impulses in PCT(i, j) are shifted by a to form its PCT(i, j) [20]. Then, the robustness of task i on machine j is the probability of completing i before its deadline, denoted $p_{ij}(\delta_i)$, and is calculated based on the following:

$$p_{ij}(\delta_i) = \sum_{t=a}^{t \leq \delta_i} c_{ij}(t)$$

Figure 2:
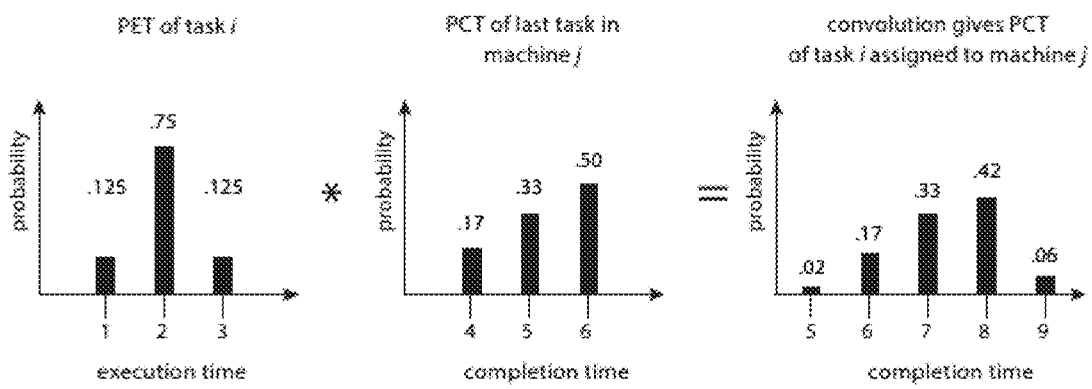
FIG. 2 provides graphs of the probabilistic execution time (PET) of an arriving task convolved with the probabilistic completion time (PCT) of the last task on machine j to form the PCT for the arriving task i on the assigned machine.

In case machine j is not idle (i.e., it has executing or pending tasks) and task i arrives, the PCT of the last task in machine j (i.e., PCT(i−1, j)) and PCT(i, j) are convolved to form PCT(i, j). This new PMF accounts for execution times of all tasks ahead of task i in the machine queue j. For example, as shown in FIG. 2, an arriving task i with $\delta_i=7$ is assigned to machine j. Then, PCT(i, j) is convolved with the PCT of the last task on machine queue j to form PCT(i, j).

For an arriving task, based on the PET matrix, the Probabilistic Completion Time (PCT) distribution on a given machine can be calculated. As shown in the below equation, the PCT of arriving task i on machine j, denoted PCT(i, j), is calculated by convolving PET of task i on machine j, denoted PMF(i, j), with PCT of the last task already mapped to machine j, denoted PCT(i−1, j).

$$PCT(i,j) = PMF(i,j) * PCT(i-1,j)$$

FIG. 2 shows an example for calculating PCT of arriving task i on a given machine j based on its PET on this machine convolved with PCT of the last task already assigned to machine queue j. Once we calculate PCT for arriving task i on machine j, we can obtain its chance of success (denoted as S(i, j)), which is defined as the probability that task i completes before its deadline. The equation below formally represents the chance of success for task i with deadline $\delta_i$ on a given machine j.

$$S(i,j)=P(PCT(i,j)\leq \delta_i)$$

Since PCT of task i relies on the PCT of tasks ahead of it in the machine queue, as the queue length grows, the compound uncertainty in task's completion time grows too. Conversely, when the queue length is shortened because of task dropping, the PET of the dropped task is no longer used in the convolution process to calculate PCT of tasks behind the dropped one. Hence, their PCT is changed in a way that their compound uncertainty is reduced and the chance of success for the affected tasks is increased.

The completion time impulses are generated differently based on the way task dropping is permitted in a system. Three scenarios are possible: (A) Task dropping is not permitted; (B) Only pending tasks can be dropped; and (C) Any task, including the executing one, can be dropped.

Where task dropping is not permitted, the following equation can be used to calculate the impulses, denoted $c^{NoDrop}_{ij}(t)$, of $C_{ij}$ from the convolution of PET(i, j) and PCT(i−1, $$c^{NoDrop}_{ij}(t) = \sum_{k=1}^{k<t}\left[e_{ij}(k)\cdot c^{NoDrop}_{(i-1)j}(t-k)\right] \quad (2)$$

When only pending tasks can be dropped, the impulses in PCT(i−1, j) that occur after the deadline of task i are not considered in calculating PCT(i, j), as that would indicate task i is dropped due to its deadline passing. Therefore, the formulation changes to reflect the impact of truncated PCT (i−1, j) in the convolution process. Owing to the complexity of calculating PCT(i, j), in this circumstance, we develop a helper function, denoted f(t,k), as shown in Equation 3, that helps Equation 4 to discard impulses from PCT(i−1, j)$\geq \delta_i$. To calculate impulse $c_{ij}(t)$, note that if t<$\delta_i$, then t−k<$\delta_i$. In this case, Equations 4 and 3 operate the same as Equation 2. However, for cases where t$\geq \delta_i$, we use the helper Equation 3 to generate an impulse by discarding impulses of PCT(i−1, j)$\geq \delta_i$. Later, in Equation 4, we add impulses in i−1 that occur after $\delta_i$ to account for when task i−1 completes at or after $\delta_i$.

$$f(t,k) = \begin{cases} 0, & \forall (t-k)\geq \delta_i \\ e_{ij}(k)\cdot c^{pend}_{(i-1)j}(t-k), & \forall (t-k)<\delta_i \end{cases} \quad (3)$$

$$c^{pend}_{ij}(t) = \begin{cases} \sum_{k=1}^{k<t} f(t,k) + c^{pend}_{(i-1)j}(t), & \forall t\geq \delta_i \\ \sum_{k=1}^{k<t} f(t,k), & \forall t<\delta_i \end{cases} \quad (4)$$

When all tasks (including the executing one) can be dropped, the completion time impulses are obtained similar to Equation 4. However, the special case happens when t=$\delta_i$ because at this time, if task i has not completed, it is dropped. For the purposes of calculating PCT(i, j) using Equation 5, PCT(i−1, j) is guaranteed to be complete by its deadline. Therefore, Equation 5 shows, all the impulses after $\delta_i$ are aggregated into the impulse at t=$\delta_i$. We should note that, the discarded impulses, i.e., those of task i−1 that occur at or after $\delta_i$, must be added to $C_{ij}$, to indicate the probabilities that task i−1 completes after task i's deadline.

$$c^{evict}_{ij}(t) = \begin{cases} \sum_{k=t}^{k<\infty} c^{pend}_{ij}(k) + c^{evict}_{(i-1)j}(t), & t=\delta_i \\ c^{evict}_{(i-1)j}(t), & \forall t>\delta_i \\ \sum_{k=1}^{k<t} f(t,k), & \forall t<\delta_i \end{cases} \quad (5)$$

Calculating completion time poses a not insignificant overhead. However, the overhead can be mitigated by pre-processing and memorizing portions of the convolution and finalizing it just in time at mapping time. It is also possible to approximate PMFs by aggregating impulses.

The pruning mechanism operates in coordination with a mapping method at each mapping event and decides to either drop or defer tasks with a low chance of success. A mapping event occurs when a task completes its execution or when a new task arrives into the system. Before any mapping decision is confirmed, the system drops any task that has missed its deadline. Due to the overhead of data transfer, we assume that a task cannot be remapped once it is mapped to a machine. After mapping, tasks assigned to a machine queue are processed in a First Come First Serve manner. Each task is executed in isolation on the machine without preemption or multitasking.

In the beginning of the mapping event, if the system is identified as oversubscribed, the pruning mechanism ("pruner") examines machine queues. Beginning at the executing task (queue head), for each task in a queue, the success probability (robustness) is calculated. Tasks whose robustness values are less than or equal to the dropping threshold are removed from the system. Then, the mapping method determines the best mapping for tasks in the batch queue. Prior to assigning the tasks to machines, the tasks with low chance of success are deferred (i.e., not assigned to machines) and returned to the batch queue to be considered during the next mapping events. This is in an effort to increase robustness of the system by waiting for a machine with better match to become available for processing the deferred task. To calibrate the pruner for a specific HC system, three sets of questions regarding deferring and dropping operations are posed that need to be addressed.

First set of questions surround the probability thresholds at which tasks are dropped or deferred. How to identify these thresholds and the relation between them? A related question arises is, should a system-level probability threshold be applied for task dropping? Or, should there be individual considerations based on the characteristics of each task? If so, what characteristics should be considered, and how should they be used in the final determination? Second, there is the matter of when to begin task dropping, and when to cease. That is, how to dynamically determine the system is oversubscribed and transition the pruner to a more aggressive mode to drop unlikely-to-succeed tasks such that the overall system robustness is improved. Pruning can potentially lead to unfair scheduling across tasks types constantly pruning compute-intensive and urgent task types in favor of other tasks to maximize the overall robustness. Hence, the third question is how the unfairness across task types can be prevented? Should the system prioritize task types that have been pruned? If so, how much of a concession should be made?

Dynamic Per-Task Dropping Threshold:

At its simplest, the task dropper can apply uniform dropping threshold for all tasks in a machine queue. However, not all tasks have the same effects on the probability of on-time completion for the tasks behind them in queue. This can be taken into account by the user to make the best decision about which tasks should stay and which are dropped.

In addition to determining task robustness, other features of completion time PMF can be valuable in making decisions about probabilistic task dropping. We identify two task-level characteristics that further influence the robustness of tasks located behind a given task i: (A) the position of task i in machine queue, and (B) the shape (i.e., skewness) of completion time PMF of task i.

In fact, the closer a task is to execution, the more tasks are affected by its completion time. For instance, with a machine queue size of six, an executing task affects the completion time of five tasks queued behind it, where the execution time of a task at the end of the queue affects no tasks. Therefore, the system should apply a higher dropping threshold for tasks close to queue head.

Skewness is defined as the measure of asymmetry in a probability distribution and is calculated based on Equation 6. In this equation, N is the sample size of a given PMF, $Y_i$ is an observation, and $Y^-$ is the mean of observations. A negative skewness value means the tail is on the left side of a distribution whereas a positive value means that the tale is on the right side. Generally, $|S| \geq 1$ is considered highly skewed, thus, we define s as bounded skewness and we have $-1 \leq s \leq 1$.

$$S = \frac{\sqrt{N(N-1)}}{N-2} \times \frac{\sum_{i=1}^{n}(Y_i - \bar{Y})^3 / N}{\sigma^3} \quad (6)$$

Figure 3:
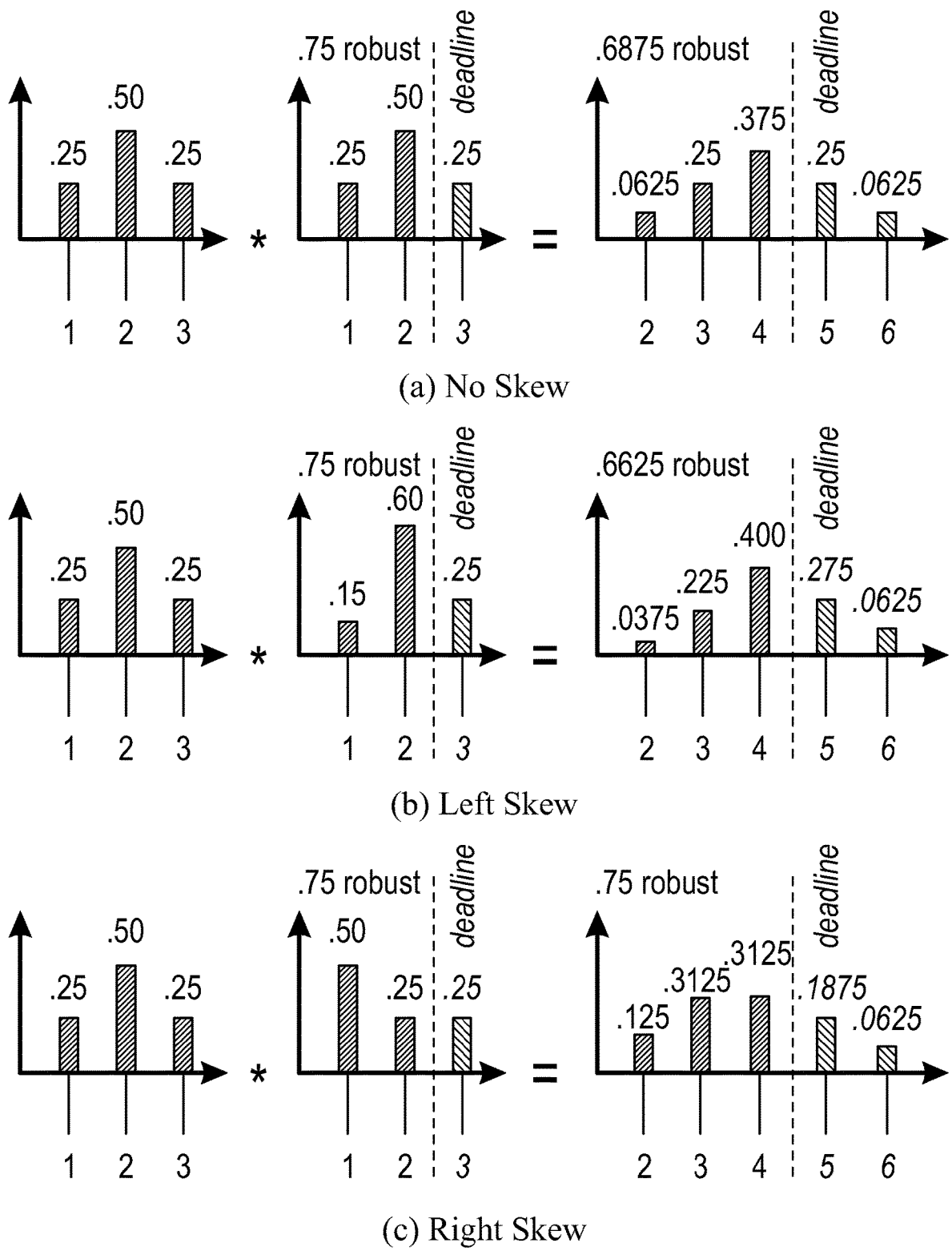
FIG. 3 provides a demonstration of effect of task i's skewness on completion time PMF of task i+1 (right-most PMFs) with a deadline 5 ($\delta_{i+1}=5$). The left-most PMFs show execution time PMF of task i+1 and the middle ones show completion time PMF of task i ($\delta_i=3$).

A negatively skewed PMF has the majority of probability occurring on the right side of PMF. Alternatively, because the bulk of a probability is biased to the left side of a PMF, a positive skew implies that a task is completed sooner than later. The middle PMFs in FIG. 3 each represents a completion time with a robustness of 0.75, however, they show different types of skewness. Using this information, we can see that two tasks with the same robustness can have different impacts on the robustness of tasks behind them in queue. Tasks that are more likely to complete sooner (i.e., positive skewness) propagate that positive impact to tasks behind them in queue. The opposite is true for negatively skewed tasks. Reasonably, we can favor tasks with positive skewness in task dropping. FIG. 3 shows the effects of different types of skews on the completion times of tasks behind them in queue. Subfigure 3(b) shows the negative effects of negative skew whereas Subfigure 3(c) shows the positive effect of positive skew on the robustness of the next task in the queue.

Using the skewness and queue position, the system can adjust a base dropping threshold dynamically, for each task in a machine queue. The adjusted dropping threshold for a given task i, denoted $\varphi_i$, is calculated based on Equation 7. To favor tasks with positively skewed completion time PMF, we negate the skewness ($s_i$). To account for position of task i in machine queue, denoted $\kappa_i$, we divide the negated skewness by the position. Addition of 1 is just to avoid division by zero and $\rho$ is a parameter to scale the adjusted dropping threshold. Ideally, this will allow more tasks to complete before their deadline, leading to a higher robustness in an HC system.

$$\phi_i = \frac{-s_i \cdot \rho}{\kappa_i + 1} \quad (7)$$

This dynamic adjustment of the probability is done only in the dropping stage of the pruner. When it comes to deferring tasks, the task position is always the same (i.e., the tail of the queue), and it is too early to consider the shape of the tasks PMF, as there are, as yet, no tasks behind it in queue.

Inferring Deferring Threshold from Dropping Threshold:

At its simplest, the pruner can use a single threshold to decide whether to defer mapping a task, as well as to decide whether to drop a mapped task. However, considering deferring threshold less than or equal to the dropping threshold, causes mapping a task with a robustness lower than the dropping threshold. Nonetheless, unless a task is dropped ahead of that mapped task, such a task is going to be dropped during the next engagement of the task dropper, leading to a poor performance. Therefore, considering deferring threshold higher than the dropping threshold benefits the overall robustness of the system. This is because the pruner waits for more robust mapping decisions and considers a gap between the requirements to map a task (i.e., deferring threshold), and the threshold required to dropping a task. Next, we explore the appropriate gap between deferring and dropping thresholds so that the robustness of HC system is maximized.

To maximize robustness of the system, the aggression of the pruning mechanism has to be dynamically adjusted in reaction to the level of oversubscription in the HC system. The pruning mechanism considers the number of tasks missed their deadlines since the past mapping event as an indicator of the oversubscription level in the system. We use the identified oversubscription level as a toggle that transitions the pruner to task dropping mode. However, in this case, the pruner can potentially toggle to dropping mode as a result of an acute spike in task-arrival, and not a sustained oversubscription state.

To judge the oversubscription state in the system, the pruner operates based on moving weighted average number of tasks that missed their deadlines during the past mapping events. Let $d_\tau$ the oversubscription level of the HC system at mapping event $\tau$; and $\mu_\tau$ the number of tasks missing their deadline since the past mapping event. Parameter $\lambda$ is tunable and is determined based on the relative weight assigned to the past events. The oversubscription level is the calculated based on Equation 8. In the experiment section, the impact of lambda is analyzed and determine an appropriate value for it.

$$d_\tau = \mu_\tau \cdot \lambda + d_{\tau-1} \cdot (1-\lambda) \quad (8)$$

Another potential concern is minor fluctuations about the toggle switching the dropping off and then back on. A Schmitt Trigger is used to prevent minor fluctuations around dropping toggle. Separate on and off values are set for the dropping toggle. Based on initial experiments, the Schmitt Trigger has 20% separation between the on and off values. For instance, if oversubscription level two or higher signals starting dropping, oversubscription value 1.6 or lower signals stopping it.

Mapping Heuristics.

Figure 11:
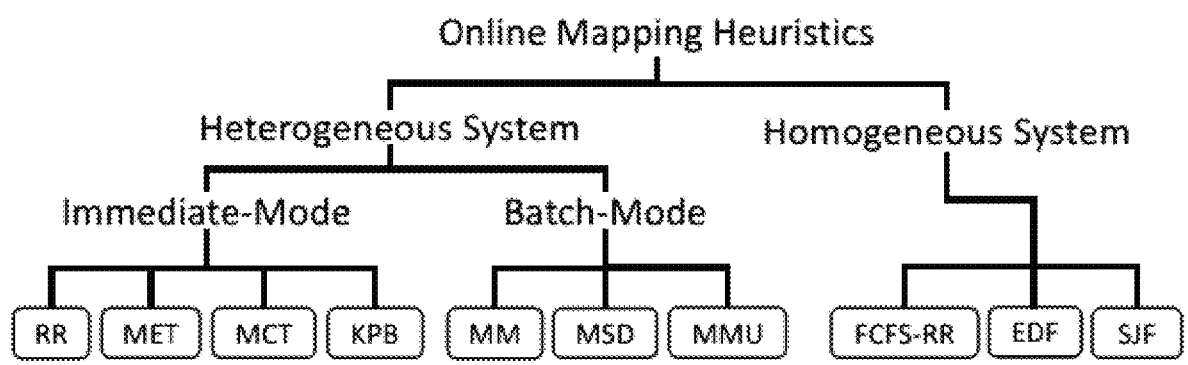
FIG. 11 provides an overview of mapping heuristics that are widely-used in various types of distributed systems.

FIG. 11 provides an overview of mapping heuristics commonly used in heterogeneous and homogeneous systems. In particular, mapping heuristics of HC systems can be further categorized based on those that operate in immediate mode versus batch-mode resource allocation systems.

Immediate-mode mapping heuristics do not hold tasks in an arrival queue and are simpler to develop. In batch-mode heuristics, however, mapping occurs both upon task arrival (when machine queues are not full) and upon task completion. Batch-mode heuristics generally use an auxiliary structure, known as virtual queue, where arriving tasks are examined on different machine queues. These heuristics commonly use a two-phase process for decision making. In the first phase, the heuristic finds the best machine for each task, by virtue of a per-heuristic objective. In the second phase, from task-machine pairs obtained in the first phase, the heuristic attempts to choose the best machine-task pairs for each available machine queue slot. After all slots are filled, or when the unmapped queue is emptied, the virtual mappings are pushed (assigned) to the machine queues, and the mapping method is complete. Although mapping heuristics used in homogeneous computing systems are of batch nature, their logic is simpler than those used in batch-mode of HC systems.

Mapping heuristics have also been independently developed. The first heuristic, PAM, leverages pruning mechanism to maximize robustness. However, the second mapping heuristic, in addition to maximizing robustness, aims at achieving fairness across task types. The batch heuristics are two-phase processes, a first phase finds the best machine for each task, by virtue of a per heuristic objective. In the second phase, from task-machine pairs obtained in the first phase, each heuristic chooses the best task-machine pair for each available machine queue slot. After all slots are filled, virtual mappings are assigned to the machine queues and the mapping method is complete.

Pruning Aware Mapper (PAM):

This heuristic uses the PET matrix to calculate task robustness and then operates based on the pruning mechanism. Before making any mapping decision, PAM analyzes the oversubscription level and performs task dropping on machine queues, if necessary. In the first phase, for each unmapped task, PAM finds the machine offers the highest robustness. Then, tasks that do not meet the deferring threshold are pruned. The second phase finds the task-machine pair with the lowest completion time and maps it to that machine's virtual queue. Ties are broken by choosing task with the shortest expected execution time.

Fair Pruning Mapper (PAMF):

Probabilistic task pruning potentially favors task types with shorter execution times, resulting in unfairness. This is because shorter tasks usually have a higher probability of completion within their deadlines. PAMF heuristic aims at mitigating this unfairness.

PAMF favors task types that have suffered from pruning. By relaxing the pruning define sufferage value at mapping event e for each task type f, denoted $\varepsilon_{ef}$, that determines how much to decrease the base pruning threshold. 0 is defined as no sufferage. Fairness factor (denoted $\vartheta$) is a constant value across all task types in a given HC system by which we change sufferage value of task types. This fairness factor denotes how quickly any task's sufferage value changes in response to missing a deadline. A high factor results in large relaxation of probabilistic requirements. Updating the sufferage value occurs upon completion of a task in the system. A successful completion of a task of type fin mapping event e results in lowering the sufferage value of task type f by the fairness factor, i.e., $\varepsilon_{ef} = \varepsilon_{(e-1)f} - \vartheta$, whereas for an unsuccessful task we add the fairness factor, i.e., $\varepsilon_{ef} = \varepsilon_{(e-1)f} + \vartheta$. We note that we limit sufferage values ($\varepsilon_{ef}$) to be between 0 to 100%. Then, the mapping heuristic determines the fair pruning threshold for a given task type f at a mapping event e by subtracting the sufferage value from the base pruning threshold.

Updated pruning threshold enables PAMF create a more fair distribution of completed tasks by protecting tasks of unfairly treated types from pruning. Once we update pruning thresholds for suffered task types, the rest of PAMF functions as PAM.

Figure 12:
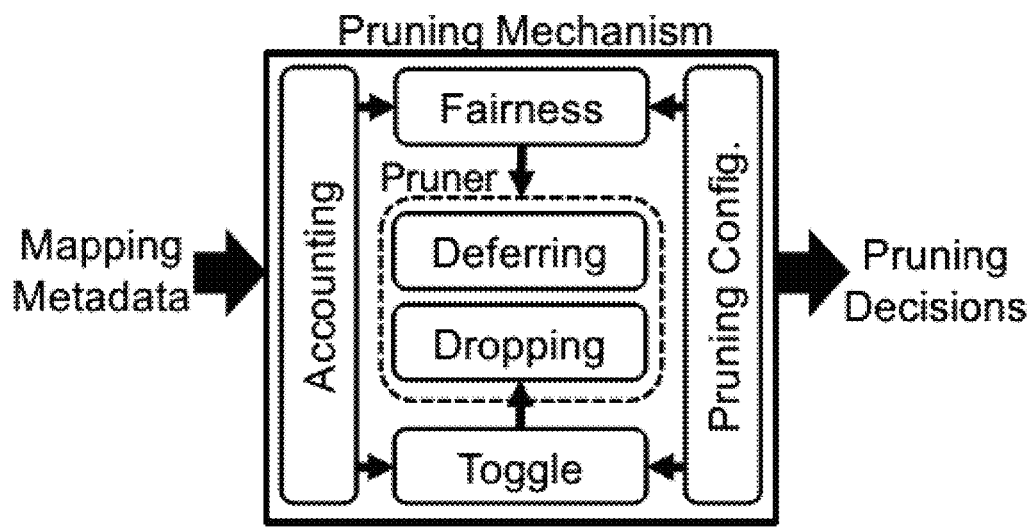
FIG. 12 is a diagram of the architectural overview of the task pruning mechanism. Pruning configuration and accounting provide inputs to Toggle and Fairness components. These inputs determine the Pruner decisions.
Figure 14:
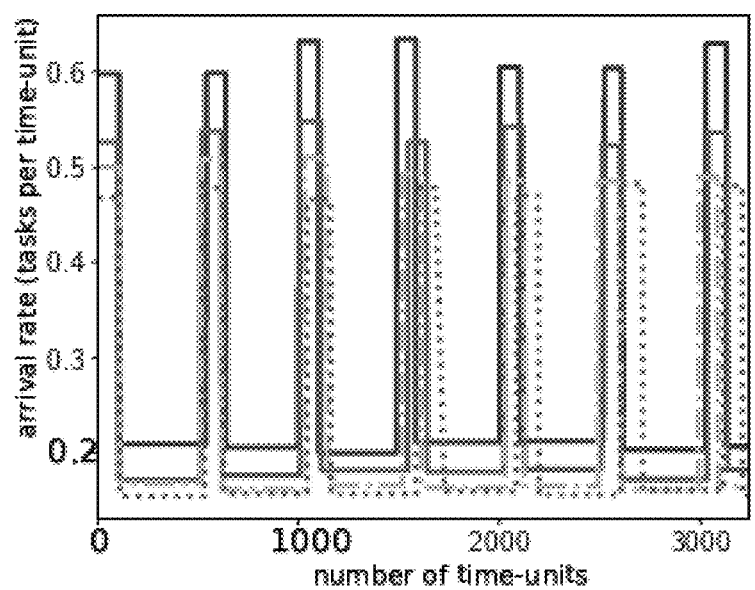
FIG. 14 shows the spiky task arrival pattern used in the experiments. Each colored bar represents one task type. For better presentation, only four task types are mapped. The vertical axis shows the task arrival rate and the horizontal axis shows the time span.

The probabilistic task pruning mechanism (Pruner) is further described. FIG. 12 shows a pruning mechanism that can be plugged into any resource allocation system and work in conjunction with any mapping heuristic to increase the robustness of the HC system. The Accounting module is in charge of gathering tasks' information (i.e., meta-data) from the resource allocation system. The Toggle module measures the oversubscription level of the HC system based on the collected information and decides whether the task dropping has to be engaged. Aiming at maximizing robustness, the Pruner module, first, calculates the chance of success for all tasks, then, enacts the pruning decision on tasks whose chance is lower than a user-defined threshold, specified in Pruning Configuration. The Fairness module keeps track of the suffered task types (i.e., those that are consistently dropped) and adjust the Pruner to avoid biasness against them.

Task dropping is defined as the act of evicting a task from the system. Task dropping can occur in two manners, namely reactive and proactive dropping. Reactive task dropping occurs when a task has already missed its deadline. Proactive task dropping, however, predictively drops tasks whose chance of success is low, before their deadline is reached. Proactive dropping is considered a more aggressive pruning decision and should be enacted only under high levels of oversubscription. Such task dropping does not only increase the chance of success for the tasks behind the dropped one, but also reduces the compound uncertainty in their completion time, which yields more informed/accurate mapping decision. Hence, task dropping in a sufficiently oversubscribed system potentially improves the overall system robustness.

Toggle module is in charge of determining when the system is sufficiently oversubscribed to shift to a more aggressive pruning via triggering task dropping. The current implementation of Toggle checks the number of tasks missing their deadlines since the previous mapping event and identifies the system as oversubscribed if the number is beyond a configurable Dropping Toggle.

Aiming at maximizing robustness, pruning can get biased to task types with shorter expected execution time, because such tasks generally provide a higher chance of success. The pruning unfairness can be harmful, as it consistently violates deadlines of certain task types. To avoid such a bias, the Accounting module keeps track of tasks that are dropped or completed. Then, the Fairness module utilizes the tasks' information to calculate the sufferage score of each task type. Each on-time completion of a task of type k reduces the sufferage score of task type k by a configurable constant value (c), whereas dropping a task of type k increases the sufferage score of its type by c value. The constant value c, termed fairness factor, can be adjusted to determine how aggressively the sufferage score changes. The sufferage score of task type k is then used as a probability offset to the Pruning Threshold of such task type.

Detailed procedure of the pruning mechanism is explained in form of a pseudo-code in FIG. 13. At the beginning of each mapping event, tasks that have already missed their deadlines are dropped (Step 1). The Fairness module uses the information collected by the Accounting module about tasks completed since the previous mapping event to update the sufferage score (Step 2). If the system is identified as oversubscribed by the Toggle module (Step 3), the Pruner is engaged to drop tasks that are unlikely to succeed from machine queues. For that purpose, the chance of success for each task is calculated (Step 5) and those whose chance is less than the Pruning Threshold are dropped (Step 6). After mapping decisions are made (and before dispatching tasks to machines), the pruner defers assigning tasks whose chance of success is less than the Pruning Threshold ($\beta$) to the next mapping event (Step 10). The remaining tasks are dispatched to their assigned machines (Step 11). Steps 7-11 are repeated until there is no remaining task in the batch queue or machine queues are full.

To evaluate the impact of pruning mechanism on a variety of widely-used mapping heuristics, a simulation study is conducted under various configurations of heterogeneous (in both immediate- and batch-modes) and homogeneous computing systems. For the experiments, Pruning Configurations are set to use Pruning Threshold of 50% and Fairness factor of 0.05, unless otherwise stated. To accurately analyze the impact of dropping and deferring, they are evaluated both individually and together.

For each set of experiments, 30 workload trials were performed using different task arrival times built from the same arrival rate and pattern. In each case, the mean and 95% confidence interval of the results are reported. The experiments were performed using the Louisiana Optical Network Infrastructure (LONI) Queen Bee 2 HPC system.

While the task completion time estimation involves multiple convolutions which impose calculation overhead, there are multiple implementation techniques that can minimize the overhead of repeated calculation, such as task grouping and memorization of partial results. Moreover, all the task pruning decisions are made by a dedicated machine which reserved for resource allocation. Therefore, pruning mechanism does not add extra overhead to each HC resources in our experiments.

Twelve SPECint benchmarks were run numerous times on a set of eight machines which were used to generate probabilistic execution time PMFs. The PMFs were generated by creating a histogram on a sampling of 500 points from a Gamma distribution formed using one of the means, and a shape randomly chosen from the range [1:20]. This was done for each of the twelve benchmarks, on each of the eight machines, resulting in the eight by twelve machine type to task type PET matrix. The PET matrix remains constant across all of our experiments.

In each experiment, a determined number of tasks per time unit are fed to the system within a finite time span. For each experiment, the system starts and ends in an idle state. As such, the first and last 100 tasks in each workload trial are removed from the data to focus the results on the portion of the time span where the system is oversubscribed.

To conduct a comprehensive evaluation, two sets of workload were examined: (A) Constant rate arrival pattern: a Gamma distribution is created with a mean arrival rate for all task types. The variance of this distribution is 10% of the mean. Each task type's mean arrival rate is generated by dividing the number of time units by the estimated number of tasks of that type. A list of tasks with attendant types, arrivals times, and deadlines is generated by sampling from each task type's distribution. (B) Variable rate (spiky) arrival pattern: In this case, tasks arrive with variable rates, as shown in FIG. 15, to mimic arrival patterns observed in HC systems. The spike times were determined uniformly, from the constant arrival workload, by dividing the workload time span to the number of spikes we want to create. During each spike, task arrival rate rises up to three times more than the base (lull) period. Each spike lasts for one third of the lull period. Since the spiky arrival pattern is frequently observed in real systems, it is our default workload arrival pattern in the experiments. For each task, the deadline is calculated by adding the mean duration for that task type ($avg_i$) to the arrival time ($arr_i$), and then adding in a slack period based on the mean of all task type's duration multiplied by a tuning parameter ($\beta \cdot avg_{all}$). This slack allows for the tasks to have a chance of completion in an oversubscribed system. In the workload trials, the value of $\beta$ of each task is randomly chosen from the range of [0.8, 2.5].

$$\delta_i = arr_i + avg_i + (\beta \cdot avg_{all})$$

Experiments were conducted under a variety of task arrival rates (oversubscription levels), however, the default rate used for plotting graphs includes 15K tasks that represents a moderately oversubscribed system. All the workload trials/methods are publicly available and known in the art.

Figure 4:
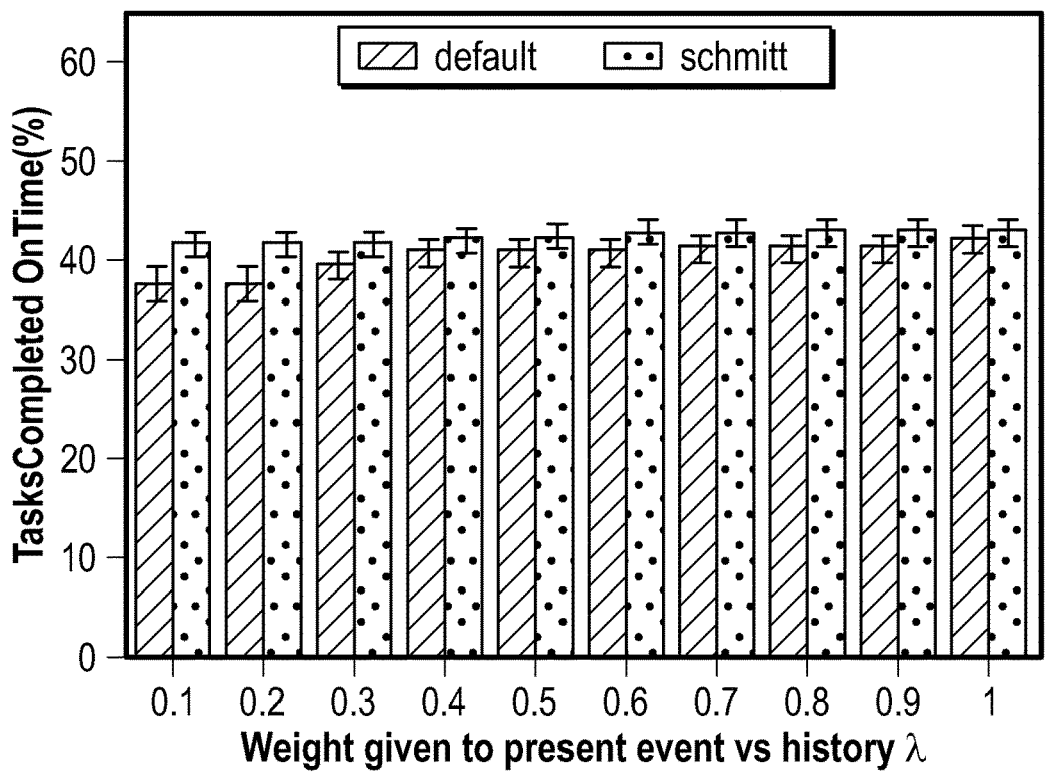
FIG. 4 provides a graph of the impact of historical oversubscription observations and Schmitt Trigger on determining oversubscription level of the HC system.

FIG. 4 shows that by assigning a higher weight to the number of dropped tasks in the most recent mapping event, the overall robustness of the system is increased from 67.7% to 71.9%. This is due in part to the steady nature of task-arrival our workload trials with only few sudden spikes. Also, we can observe that applying Schmitt Trigger results in a higher robustness. Specifically, we observe that $\lambda$=0.9 provides a statistically and practically higher robustness, hence, is appropriate for identifying oversubscription level.

We can conclude that under high oversubscription levels, the best results come from taking immediate action when tasks miss their deadlines, and then a steady application of probabilistic task dropping until the situation is decidedly controlled (i.e., reaching the lower bound of Schmitt Trigger).

One goal in this experiment is to evaluate the impact of Toggle module within the pruning mechanism. Recall that the Toggle module is in charge of triggering task dropping operation. As such, we evaluate three scenarios: First, when there is no Toggle module in place and dropping operation is never engaged (referred to as "no Toggle, no dropping"); Second, when Toggle module is not in place and task dropping is always engaged (referred to as "no Toggle, always dropping"); Third, when the Toggle module is in place and is aware of (i.e., reactive to) oversubscription (referred to as "reactive Toggle"). In this case, the Toggle module engages task dropping only in observation of at least one task missing its deadline, since the previous mapping event.

FIG. 15($a$) shows the results for the immediate-mode mapping heuristics and FIG. 15($b$) shows them for the batch-mode. In both cases, we can observe that when Toggle functions in reaction to oversubscription, the overall system robustness is improved, regardless of the mapping heuristic deployed. The only exception is RR immediate-mode heuristic. The reason is that RR does not take execution time or completion time into account and it continuously maps tasks with a relatively low chance of success. These mapped tasks are subjected to be removed by task dropping. Without probabilistic task dropping, some of those low-chance tasks can complete on time. We can also observe that in immediate-mode, KPB provides the highest robustness (percentage of tasks completing on time) and also benefits the most from task dropping. This is because it makes more informed mapping decisions after dropping underperforming tasks.

The impact of task deferment within the pruning mechanism can also be assessed. As deferring operation works on the arrival (batch) queue, it can only be enabled for batchmode heuristics. We conducted the experiment for task pruning threshold set to 0% (no task pruning), 25, 50%, and 75%. As the results of this experiment are more prominent under high level of oversubscription, we set the task arrival to 25K tasks in the workload trials.

Figure 16:
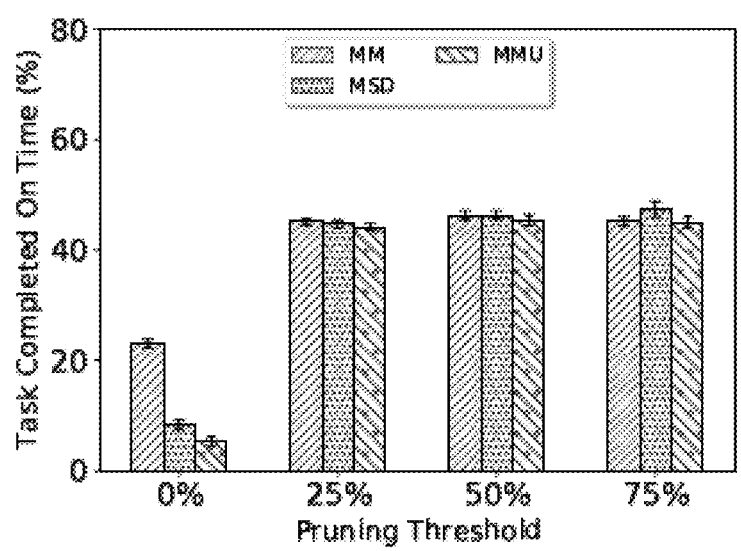
FIG. 16 provides a graph of the impact of tasks deferring on batch-mode mapping heuristics in a HC System with workload intensity of 25k. The vertical axis shows the percentage of tasks completed on time. The horizontal axis is the minimum success probability needed for each task to be mapped.

FIG. 16 shows that, without task deferring (i.e., when Pruning Threshold is zero), MM, MSD, and MMU's robustness are the lowest (between 5% and 23%). However, as task deferring is employed, all mapping heuristics can attain more than 44% robustness. This is because pruning mechanism delays mapping of tasks with low chance of success until a more suitable machine becomes available. Hence, machines are utilized only to execute promising tasks, thereby increasing the robustness. Our observation also implies that, for these widely used batch mode mapping heuristics, by limiting the selection-pool of a mapping-heuristic to likely-to-succeed tasks, task deferring can reduce the performance differences of the heuristics to offer similar robustness, regardless of their algorithmic logic.

Figure 8:
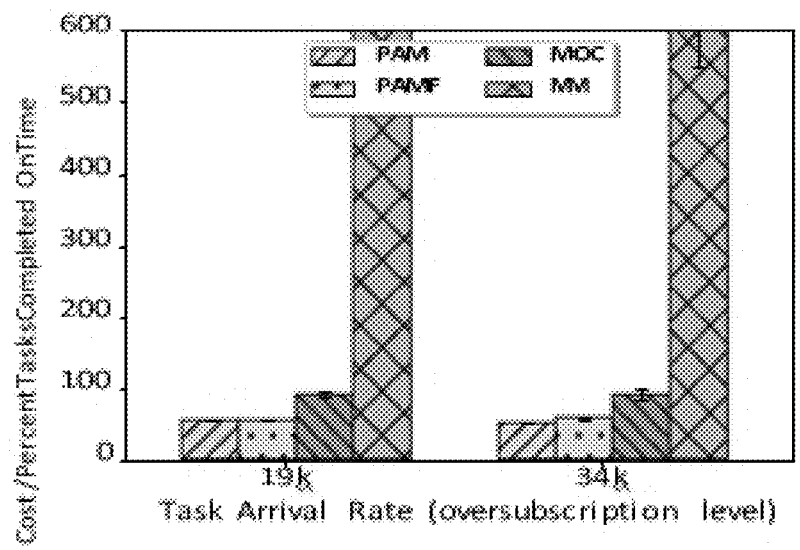
FIG. 8 provides a graph of the impact of probabilistic pruning on incurred costs of using resources. The horizontal axis provides the oversubscription level.

In FIG. 8, we can see that, in all heuristics, the robustness does not improve for Pruning Thresholds higher than 50%. In fact, a high Pruning Threshold makes the system conservative in allocating tasks and defers tasks whose completion can improve overall robustness. Therefore, setting Pruning Threshold to 50% is a proper configuration for the pruning mechanism.

Figure 5:
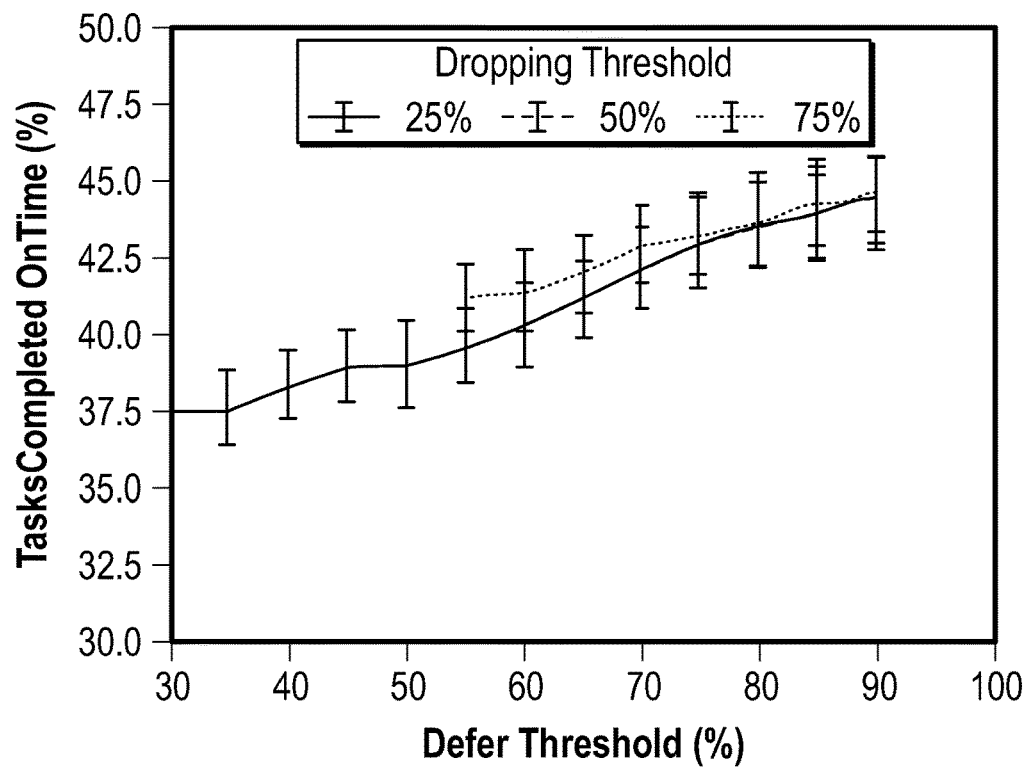
FIG. 5 provides a graph of the impact of deferring and dropping thresholds. Dropping threshold is denoted by line type and color.

FIG. 5 shows that using a higher deferring threshold leads to higher system robustness. We observe that if the deferring threshold is chosen high enough, the impact of dropping threshold on the system robustness diminishes. That is, with a high dropping threshold (e.g., 75%) we obtain the same system robustness with a low dropping threshold (e.g., 25%). However, we note that higher dropping threshold can influence the incurred cost of using an HC system, because they prevent wasting time processing unlikely-to-succeed tasks that have been mapped to the system. In the rest of experiments, dropping threshold 50% and deferring threshold 90% is used.

Figure 6:
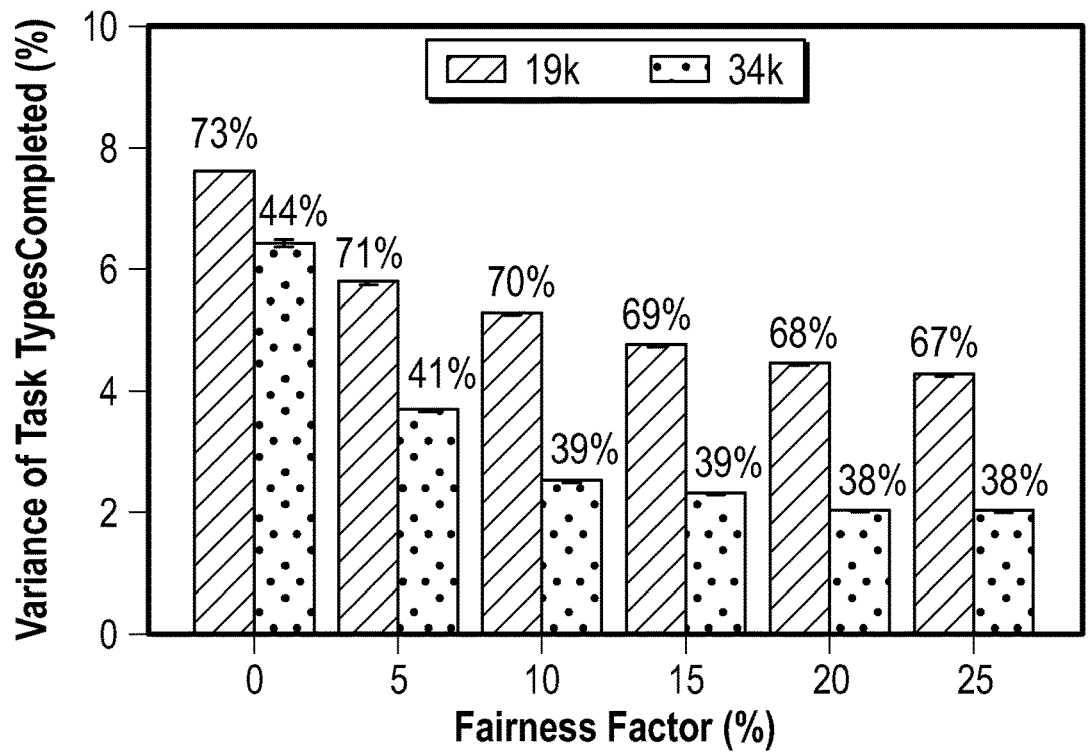
FIG. 6 provides a graphical evaluation of fairness and robustness. The horizontal axis shows the fairness factor modifier to the sufferage value. The vertical axis is the variance of completed task types. Values above bars show robustness.

The system can be tested using a fairness factor ranging from 0% (i.e., no fairness) to 25%. Recall that this fairness factor is the amount by which we modify the sufferage value for each task type. The sufferage value for a given task type at a given mapping event is subtracted from the required threshold, in an effort to promote fairness in completions amongst task types. For each fairness factor, reported is: (A) The variance in percentage of each task type completing on time. The objective is to minimize the variance among these. (B) The overall robustness of the system, to understand the robustness we have to compromise to attain fairness. Robustness value is noted above each bar in FIG. 6. Oversubscription level of 19k and 34k tasks is tested. FIG. 6 shows that significant improvement in fairness can be attained at the cost of compromising robustness. In particular, using 5% fairness factor results in remarkable reduction in variance of completed tasks that implies increasing fairness. For instance, for 34k tasks, the variance drops from 6% to 3.5%, at a cost of '10% reduction in robustness (from 44.2% to 40.5%). This compromise in robustness is because deferring fewer tasks in an attempt to improve fairness results in fewer tasks successfully completed overall. Further increasing fairness factor results in insignificant changes on fairness and robustness, therefore, we configure PAMF with 5% fairness factor in the experiments Evaluating the impact of the pruning mechanism holistically under various oversubscription levels can also be done. The system robustness is evaluated now when mapping heuristics are coupled with and without the pruning mechanism. The pruning mechanism is configured with Pruning Threshold of 50% and Toggle is set to engage task dropping reactively.

Figure 7:
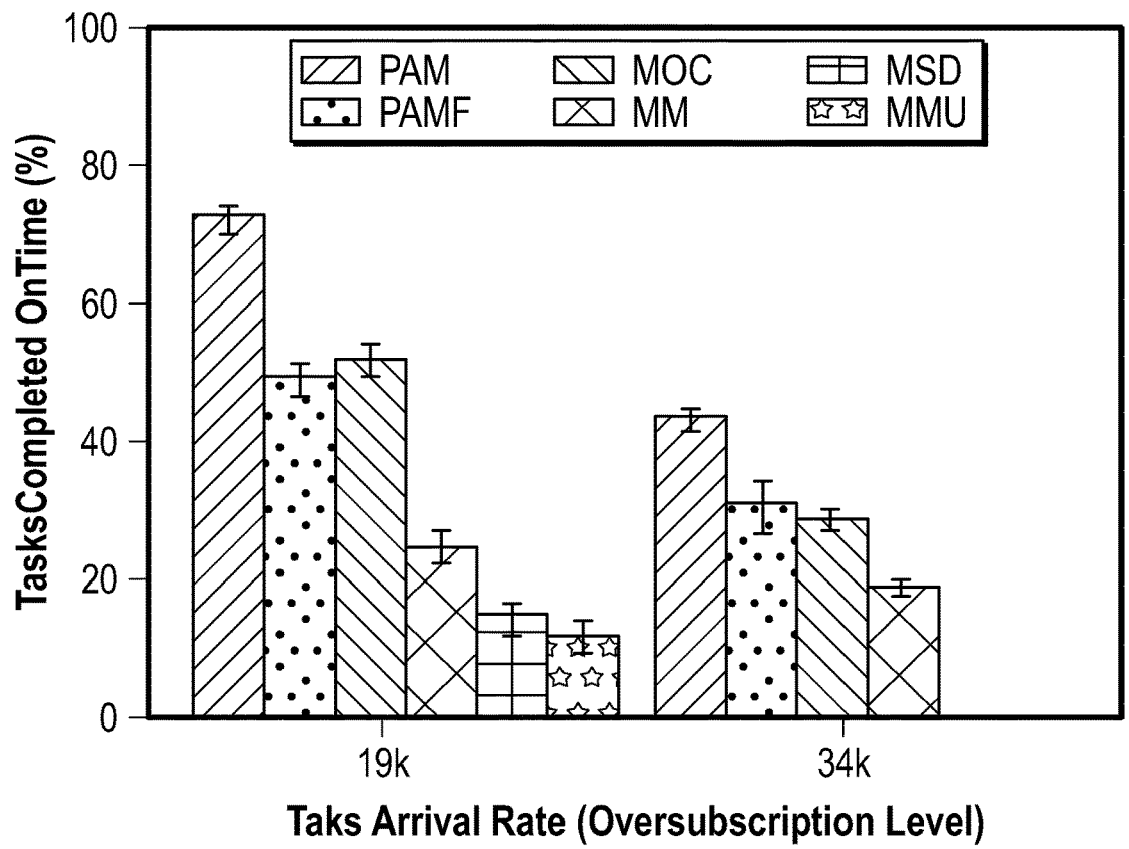
FIG. 7 provides a comparison of the PAM and PAMF against other heuristics. The horizontal axis shows oversubscription in the form of number of tasks.

In FIG. 7, we observe that PAM results in a substantial increase in system robustness versus other heuristics, at nearly 70% and PAMF results in nearly 50% robustness, trading percentage of tasks completed for types of tasks completed. MOC, another robustness-based heuristic, is the closest in robustness to PAM, rivaling PAMF, at nearly 50%. The inability to probabilistically drop tasks leads to wasted processing and delayed task mapping, thereby lowering robustness. With robustness of '25%, the performance of MinMin lags far behind, as it allocates tasks to machines no matter how unlikely they are to succeed. The robustness offered by both MSD and MMU suffers in comparison because these heuristics, instead of maximizing performance of the most-likely tasks, prioritize tasks whose deadlines or urgency is closest (i.e., least likely to succeed tasks). With an oversubscription of 34k tasks, MSD and MMU only map tasks that fail to meet their deadline.

Another goal, investigation of incurred cost of resources, using the Amazon Cloud VMs as an example, its pricing has been mapped to the machines in the simulation. Each machine's usage time is tracked. The price incurred to process the tasks is divided by the percentage of on-time tasks completed to provide a normalized view of the incurred costs in the system. FIG. 8 shows that in an oversubscribed system both PAM and PAMF incur a significantly ('40%) lower cost per completed task than MOC and other heuristics. At extreme levels of oversubscription, the difference between heuristics such as MMU and MSD and PAM become unchartable, as MSD and MMU both prioritize tasks least likely to succeed, whereas PAM prioritizes those most likely to succeed. While previous tests have shown PAM outperforms other heuristics in terms of robustness in the face of oversubscription, these results show that in most levels of oversubscription, the benefits are realized in dollar cost as well, due to not processing tasks needlessly.

Figure 9:
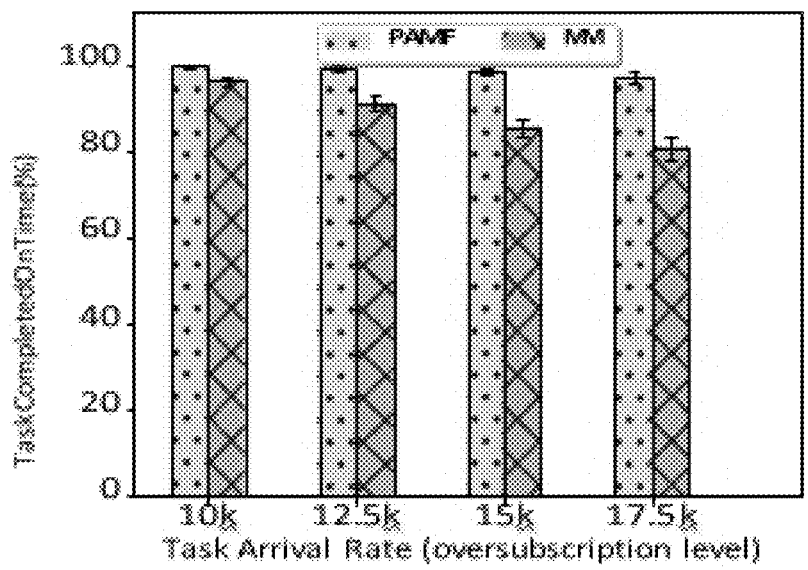
FIG. 9 provides a graphical comparison of the PAMF against MinMin using video transcoding workload. The horizontal axis shows the oversubscription level by number of tasks.

To evaluate PAMF under a real-world setting, we compare it against MinMin on video transcoding workload traces under different oversubscription levels (horizontal axis in FIG. 9). The PET matrix captured from running four video transcoding types on 660 video files (available in the art) on four heterogeneous Amazon EC2 VMs, namely CPU-Optimized, Memory-Optimized, General Purpose, and GPU. The experimental result confirms our earlier observation and show that PAMF outperforms MinMin specifically as the level of oversubscription increases.

FIG. 9 shows that, for all heuristics under both constant and spiky arrival pattern, pruning mechanism improves the robustness. Pruning mechanism makes the largest impact for MSD and MMU. These heuristics attempt to map tasks with short deadlines and, thus, low chance of success. By limiting these heuristics to map tasks whose chance is beyond a certain threshold, their overall system robustness is improved.

In addition to mapping heuristics for heterogeneous system, we also conduct experiments on homogeneous mapping heuristics to evaluate the impact of pruning mechanism. Pruning configurations are set to use reactive Toggle and Pruning Threshold of 50%.

FIG. 16 shows that, in all levels of oversubscription, applying pruning mechanism to homogeneous systems significantly increases system robustness (by up to 28%) for all mapping heuristics on both constant and spiky arrival pattern. Importantly, as the oversubscription level increases, the impact of pruning mechanism is more substantial. With 25K tasks arrival rate, in constant arrival pattern, EDF and SJF can only achieve 4% and 10% robustness, respectively. Coupling pruning mechanism into these heuristics raises both the robustness to more than 30%. The reason is that, similar to heterogeneous systems, pruning mechanism allows the system to avoid mapping unlikely-to-succeed tasks, which appear more often under higher levels of oversubscription.

The disclosure enhances robustness of an HC system, deployed for serverless computing, via pruning task requests with low chance of success. A stand-alone pruning mechanism has been introduced that can be plugged into any task mapping heuristic without requiring any change in the resource allocation system. Evaluation results of applying the pruning mechanism on widely-used mapping heuristics in both homogeneous and heterogeneous systems showed that probabilistic dropping and deferring of unlikely-to-succeed tasks can increase the overall system robustness. The improvement was more remarkable (up to 35 percentage point) for heuristics with far-from-optimal mapping decisions (e.g., MMU and EDF). Even in the case of MinMin mapping heuristic, the pruning mechanism led to 15 percentage point increase in robustness. We can conclude that, regardless of the underlying mapping heuristic, probabilistic task pruning can effectively improve robustness of serverless computing platforms, particularly when the system is oversubscribed.

From the system perspective, probabilistic task pruning improves energy efficiency by saving the computing power that is otherwise wasted to execute failing tasks. Such saving in computing can also reduce the energy required and incurred cost of using cloud resources for the serverless computing provider.

The described mechanism improves the robustness of HC systems via pruning tasks with low probability of success. The pruning mechanism is designed as part of resource allocation system in the system. For pruning, we determined probability values used by mapping heuristics to either map or defer a task. We concluded that: (A) when the system is not oversubscribed, tasks with low chance of success should be deferred (i.e., wait for more favorable mapping in the next mapping); (B) When the system is sufficiently oversubscribed, the unlikely to-succeed tasks must be dropped to alleviate the oversubscription and increase the probability of other tasks succeed; (C) The system benefits from setting higher deferring threshold than dropping threshold. We developed a mapping heuristic, PAM, based on the probabilistic task pruning and showed that it can improve system robustness by on average by '25%. We upgraded PAM to accommodate fairness by compromising around four percentage points robustness. Evaluation results revealed that pruning mechanism (and PAM) does not only improve system robustness but also reduces the cost of using cloud-based HC systems by '40%.

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies.

Modifications, additions, or omission may be made to the systems, apparatuses and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to a member of a set or each member of a subset of a set.

Furthermore, the described features, structures, or characteristics may be combined in any suitable manner in one or more embodiments. Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

Moreover, the terms "substantially" or "approximately" as used herein may be applied to modify any quantitative representation that could permissibly vary without resulting in a change to the basic function to which it is related.

The invention claimed is:

1. A method for performing task pruning in a resource allocation system,
    wherein the resource allocation system comprises one or more mapping heuristics;
    wherein one or more tasks arrive into the resource allocation system;
    wherein the one or more tasks are queued upon arrival into a batch queue;
    comprising:
        establishing a dropping threshold;
        dropping one or more low quality tasks by a pruning mechanism;
        creating a mapping event;
        evaluating the oversubscription level of the computing system;
        for each task in the batch queue, the mapping event attempts to map said tasks in the batch queue to one or more machine queues, comprising:
            creating a virtual queue of one or more machine-task mappings;
            calculating a completion time distribution of one or more unmapped tasks to one or more machines;
            deferring tasks with low chances of success; and
            returning the tasks that have been deferred to the batch queue until a subsequent mapping event;
        calculating an impact of dropping a low quality task, wherein a pruning mechanism calculates a completion time and a probability of timely completing the task subsequent to the dropped low quality task;
        determining a best machine for each task by the mapping heuristic;
        selecting which task will be paired with which machine queue by the mapping heuristic; and
        mapping each task from the batch queue to a machine queue until no tasks remain in the batch queue;
        wherein calculating the impact further comprises generating one or more impulses representing a completion time of each task.

2. The method of claim 1, wherein low quality tasks comprise tasks that have missed their deadlines.

3. The method of claim 1, wherein low quality tasks comprise tasks that have a low chance of success, wherein tasks with a low chance of success are those that are unlikely to be completed before their deadlines.

4. The method of claim 1, wherein a mapping event occurs when a task completes its execution.

5. The method of claim 1, wherein a mapping event occurs when a new task arrives into the system.

6. The method of claim 1, wherein the tasks assigned to a machine queue are processed in a first come first served manner.

7. The method of claim 1, where the tasks assigned to a machine queue are executed in isolation without preemption or multitasking.

8. The method of claim 1, wherein the dropping threshold is dynamically adjusted based upon a skewness and a position in the batch queue of each task.

9. The method of claim 1, wherein the pruning mechanism's level of aggression is dynamically adjusted in reaction to the oversubscription level in the computing system.

10. The method of claim 1, wherein the oversubscription level is determined by evaluating a weight average number of the tasks that missed their deadlines during past mapping events.

11. The method of claim 1, wherein at least one mapping heuristic is configured to leverage the pruning mechanism to maximize robustness.

12. The method of claim 1, wherein at least one mapping heuristic is configured to achieve fairness across the tasks.

13. The method of claim 1, wherein best machine for the task is the machine with the highest robustness.

14. A pruning mechanism for a resource allocation system comprising:
    an accounting module;
    a toggle module;
    a pruner module;
    a pruning configuration; and
    a fairness module;
wherein the accounting module is configured to gather one or more task's information from the resource allocation system;
wherein the toggle module comprises functionality to measure the heterogeneous computing system's oversubscription level;
wherein the fairness module comprises functionality to avoid bias; and
wherein the toggle module measures the computing system's oversubscription level by:
    monitoring a total amount of tasks that have missed their deadlines since a prior mapping event; and
    identifying the computing system as oversubscribed if the total amount of tasks exceeds a Dropping Toggle.

15. The pruning mechanism of claim 14, wherein the pruning configuration comprises a user-defined threshold required level of success for tasks.

16. The pruning mechanism of claim 14, wherein the fairness module avoids bias by:
    monitoring a one or more task types that are dropped by the pruning mechanism; and
    adjusting the pruning mechanism to avoid bias against task types that are consistently dropped.

17. The pruning mechanism of claim 14, wherein the accounting module further comprises capability to record the tasks that are completed or dropped.

* * * * *